(12) United States Patent
Sakurai et al.

(10) Patent No.: US 6,910,327 B2
(45) Date of Patent: Jun. 28, 2005

(54) APPARATUS AND METHODS FOR VARYING INLET LIP GEOMETRY OF A JET ENGINE INLET

(75) Inventors: Seiya Sakurai, Seattle, WA (US); Stephen J. Fox, Everett, WA (US); Kristin E. Grimlund, Everett, WA (US)

(73) Assignee: The Boeing Company, Chicago, IL (US)

(*) Notice: Subject to any disclaimer, the term of this patent is extended or adjusted under 35 U.S.C. 154(b) by 49 days.

(21) Appl. No.: 10/628,620

(22) Filed: Jul. 28, 2003

(65) Prior Publication Data

US 2005/0022866 A1 Feb. 3, 2005

(51) Int. Cl.[7] .................................................. F02C 7/04
(52) U.S. Cl. .......................... 60/204; 60/269; 244/53 B; 137/15.1
(58) Field of Search ................. 60/204, 269; 244/53 B; 137/15.1, 15.2

(56) References Cited

U.S. PATENT DOCUMENTS

| | | | |
|---|---|---|---|
| 3,485,252 A | * | 12/1969 | Brown ....................... 137/15.1 |
| 3,504,870 A | | 4/1970 | Cole et al. |
| 3,964,568 A | | 6/1976 | Neumann |
| 4,012,013 A | * | 3/1977 | Ball et al. ................. 244/53 B |
| 5,301,901 A | * | 4/1994 | Kutschenreuter, Jr. .... 244/53 R |
| 6,089,505 A | | 7/2000 | Gruensfelder et al. |
| 6,231,006 B1 | * | 5/2001 | Gruensfelder et al. .... 244/53 B |
| 6,260,567 B1 | | 7/2001 | Gruensfelder et al. |
| 6,375,126 B1 | | 4/2002 | Sakurai et al. |

* cited by examiner

Primary Examiner—Ehud Gartenberg
(74) Attorney, Agent, or Firm—Harness Dickey & Pierce P.L.C.

(57) ABSTRACT

Apparatus for varying inlet lip geometry of a inlet formed at forward end portion of a jet engine housing. In one embodiment, the apparatus includes a variable camber skin portion hingedly coupled to the forward end portion of the housing. The apparatus also includes a linkage assembly coupled to the forward end portion and the skin portion. The linkage assembly operates to rotate the skin portion relative to the forward end portion and to alter a curvature of the skin portion to thereby configure the skin portion into a corresponding one of a plurality of configurations. The plurality of configurations include at least a first configuration and a second configuration. In the first configuration, the skin portion forms a rounded inlet lip portion extending forwardly of the inlet. In the second configuration, the linkage assembly and the skin portion are retracted within a recessed area in the housing to form an aerodynamically smooth outer surface of the housing.

36 Claims, 6 Drawing Sheets

APPARATUS AND METHODS FOR VARYING INLET LIP GEOMETRY OF A JET ENGINE INLET

FIELD

The present invention relates generally to jet engine inlets and more particularly to apparatus and methods for varying inlet lip geometry of jet engine inlets.

BACKGROUND

Inlets of jet engines on existing aircraft shape the incoming airflow to the jet engine. The lip geometry (e.g., lip radii), ramp angles and capture area all effect the incoming airflow.

Existing jet aircraft engines typically include inlets which have a fixed geometry that remains constant regardless of the operational phase of the aircraft. However, optimal inlet geometry often varies for the different operational phases of the aircraft. For example, the optimal inlet geometry for the takeoff and/or landing phases of a particular aircraft is most likely different than the optimal inlet geometry for cruise.

Typically, fixed geometry inlets are not optimized for any one flight condition. Instead, the design is a compromise of performance around a variety of mission segments. Thus, the inlet geometry is not optimized at a variety of angles of attack and aircraft speeds, which may limit the range and thrust of the aircraft.

Accordingly, apparatus and methods for varying inlet lip geometry for different angles of attack and airspeeds provide improved engine performance over a variety of flight conditions during the various phases of operation of the aircraft.

SUMMARY

Apparatus and methods for varying inlet lip geometry of a jet engine inlet, in one embodiment, include a variable camber skin portion hingedly coupled to the forward end portion of the housing. A linkage assembly is coupled to the forward end portion and the skin portion. The linkage assembly operates to rotate the skin portion relative to the forward end portion and to alter a curvature of the skin portion to thereby configure the skin portion into a corresponding one of a plurality of configurations. The plurality of configurations include at least a first configuration and a second configuration. In the first configuration, the skin portion forms a rounded inlet lip portion extending forwardly of the inlet. In the second configuration, the linkage assembly and the skin portion are retracted within a recessed area in the housing to form an aerodynamically smooth outer surface of the housing.

Further areas of applicability of the present invention will become apparent from the detailed description provided hereinafter. It should be understood that the detailed description and specific examples, while indicating at least one exemplary embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference characters indicate corresponding features throughout the drawings.

DETAILED DESCRIPTION OF THE EXEMPLARY EMBODIMENTS

Figures 1, 2:
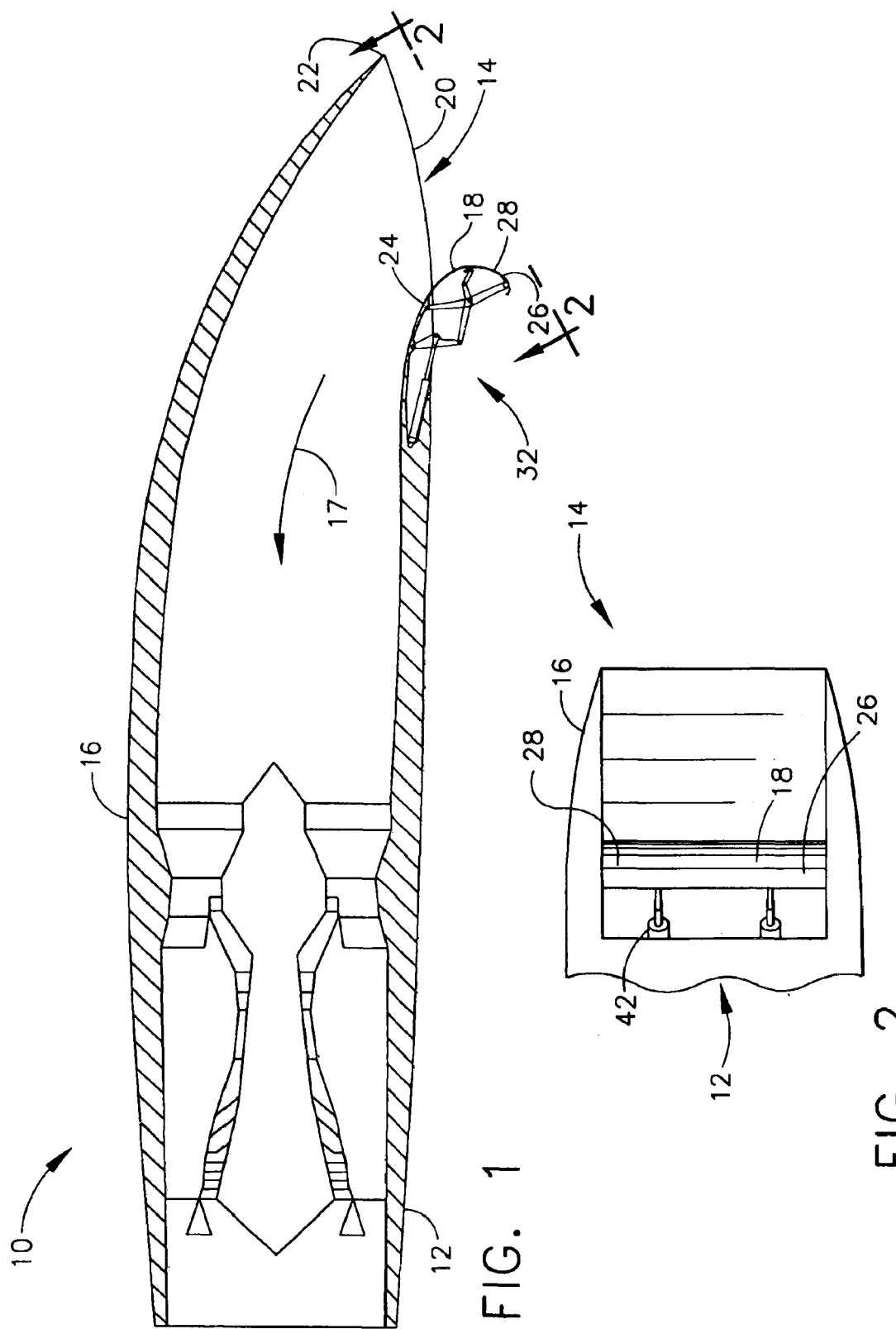
FIG. 1 is a plan view of an exemplary engine including an apparatus for varying inlet lip geometry in an extended position according to one embodiment of the invention.
FIG. 2 is a front elevation view of the engine inlet of FIG. 1.
Figure 3:
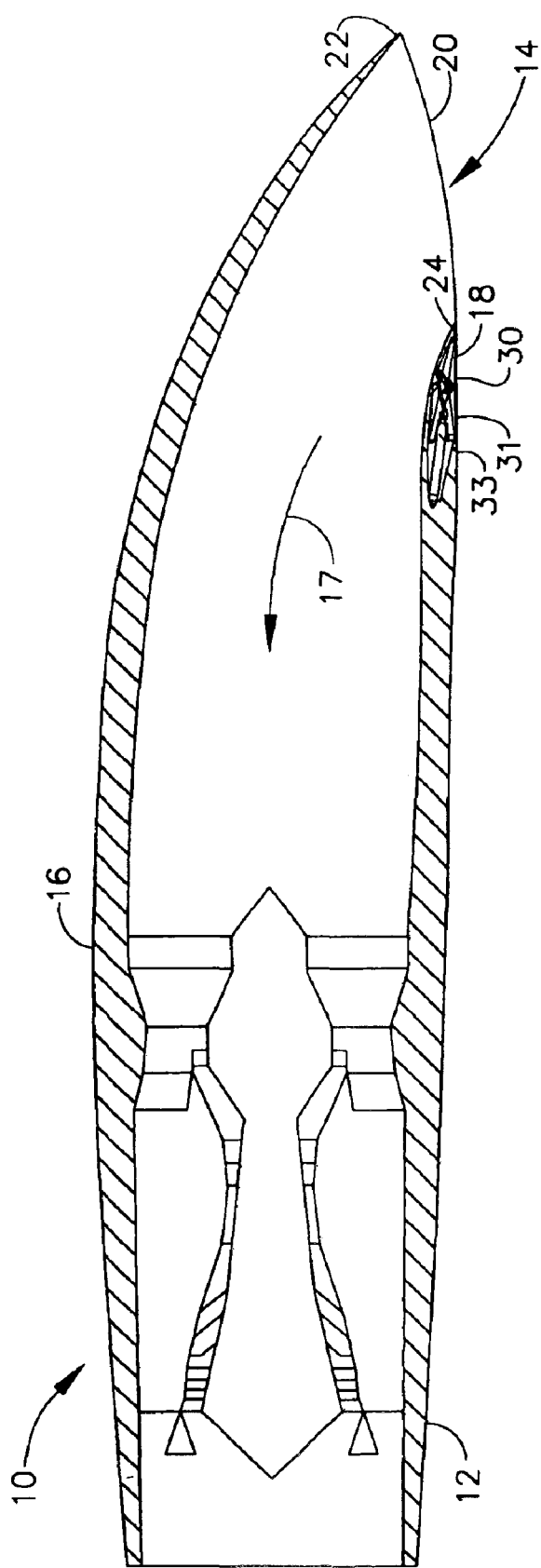
FIG. 3 is a plan view of the engine of FIG. 1 but with the apparatus for varying inlet lip geometry in a retracted position.

Referring to FIGS. 1 through 3, there is shown an aircraft engine 10 in accordance with an exemplary embodiment of the invention. As shown, the engine 10 includes a housing or nacelle 12 and an inlet 14, which is formed at a forward end portion 16 of the nacelle 12. The inlet 14 provides air to the jet engine 10. The direction of the airflow is indicated by arrow 17.

Figure 4:
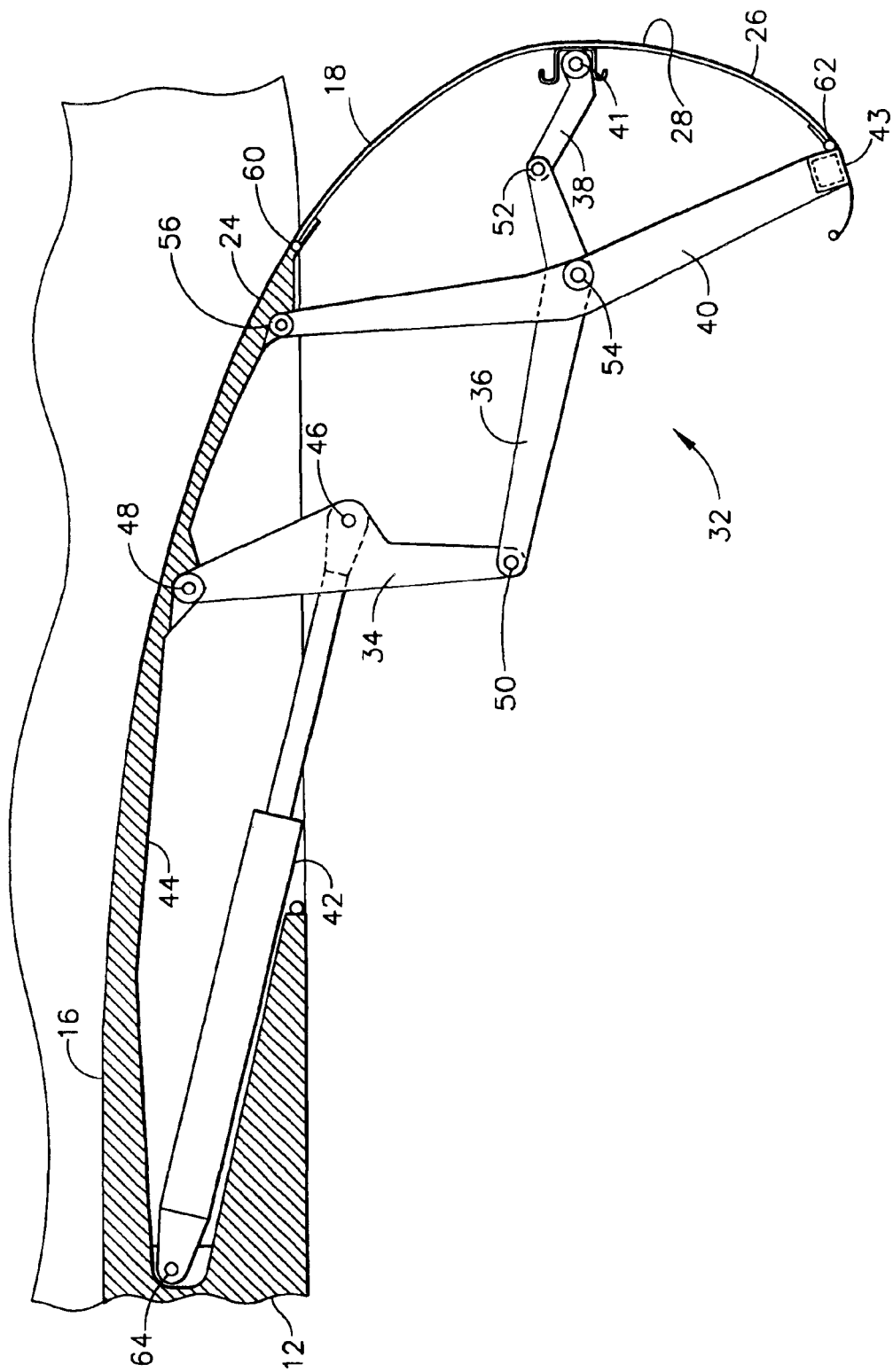
FIG. 4 is a plan view of the apparatus for varying inlet lip geometry shown in FIG. 1.

As best shown in FIG. 4, a variable camber skin portion 18 is hingedly coupled to the forward end portion 16. A linkage assembly 32 is coupled to the forward end portion 16 and the skin portion 18. As described in greater detail below, the linkage assembly 32 operates to rotate the skin portion 18 relative to the forward end portion 16 and to alter a curvature of the skin portion 18 to thereby configure the skin portion 18 into a corresponding one of a plurality of configurations.

The lip of the inlet 14 has a different geometry for each configuration of the skin portion 18. Accordingly, embodiments of the invention allow the lip geometry of the inlet 14 to be varied during different phases of operation of the aircraft. Varying the shape of the inlet lip controls the profile of the air flow stream into the inlet and the capture area.

Embodiments of the invention also allow the inlet lip geometry to be adjusted or tailored to the particular operational phase of the aircraft (e.g., takeoff, landing, cruise, etc.) to improve engine inlet performance during that operational phase. The preferred inlet lip geometry for a particular operational phase will depend at least in part on the particular type of aircraft and engine.

Figure 6:
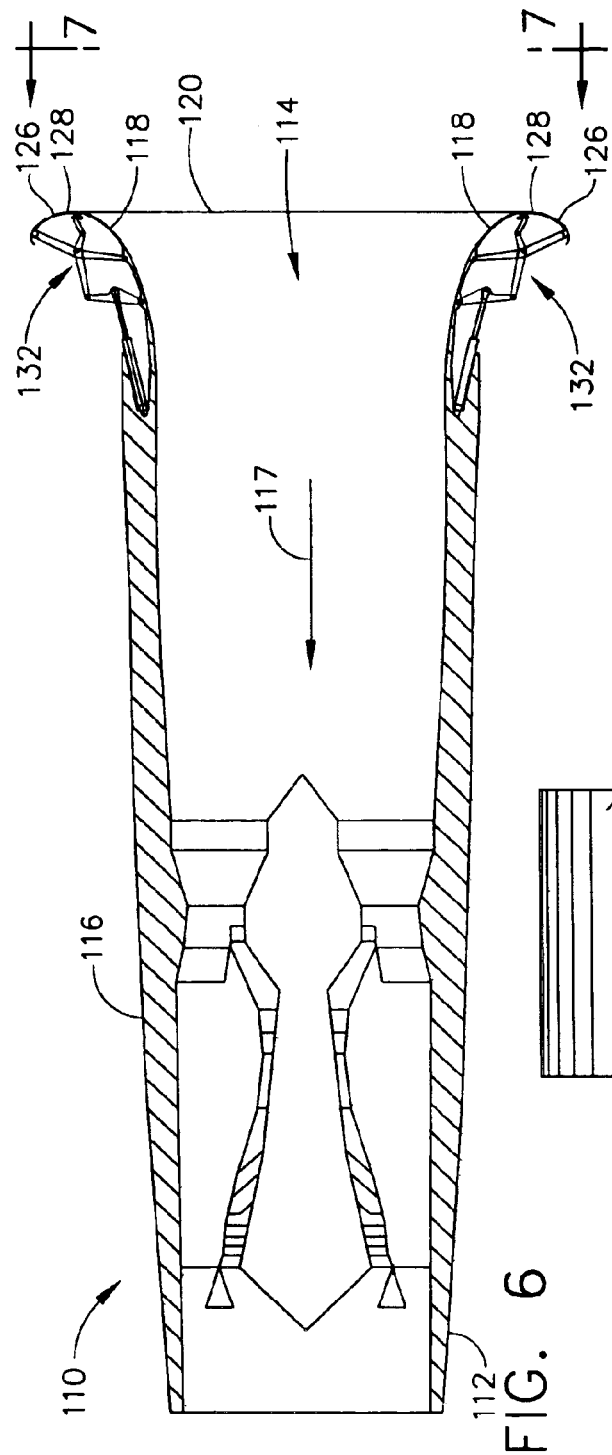
FIG. 6 is a plan view of another exemplary engine including an apparatus for varying inlet lip geometry in an extended position according to another embodiment of the invention.
Figure 7:
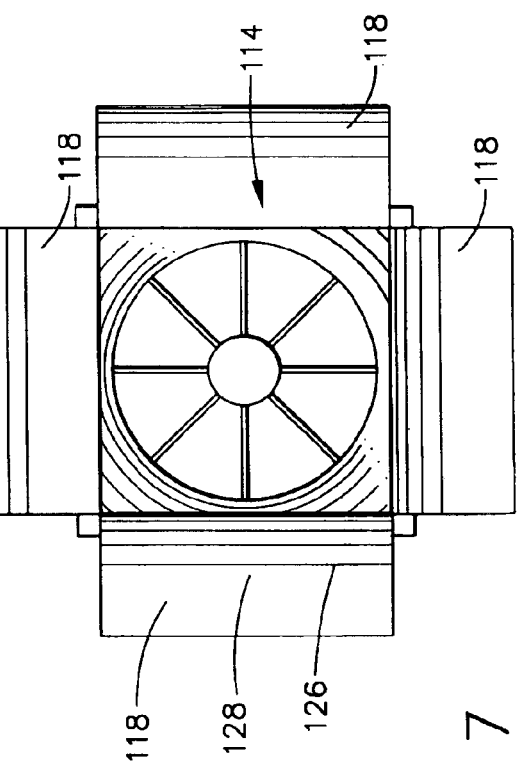
FIG. 7 is a front elevation view of the engine inlet of FIG. 6.
Figure 8:
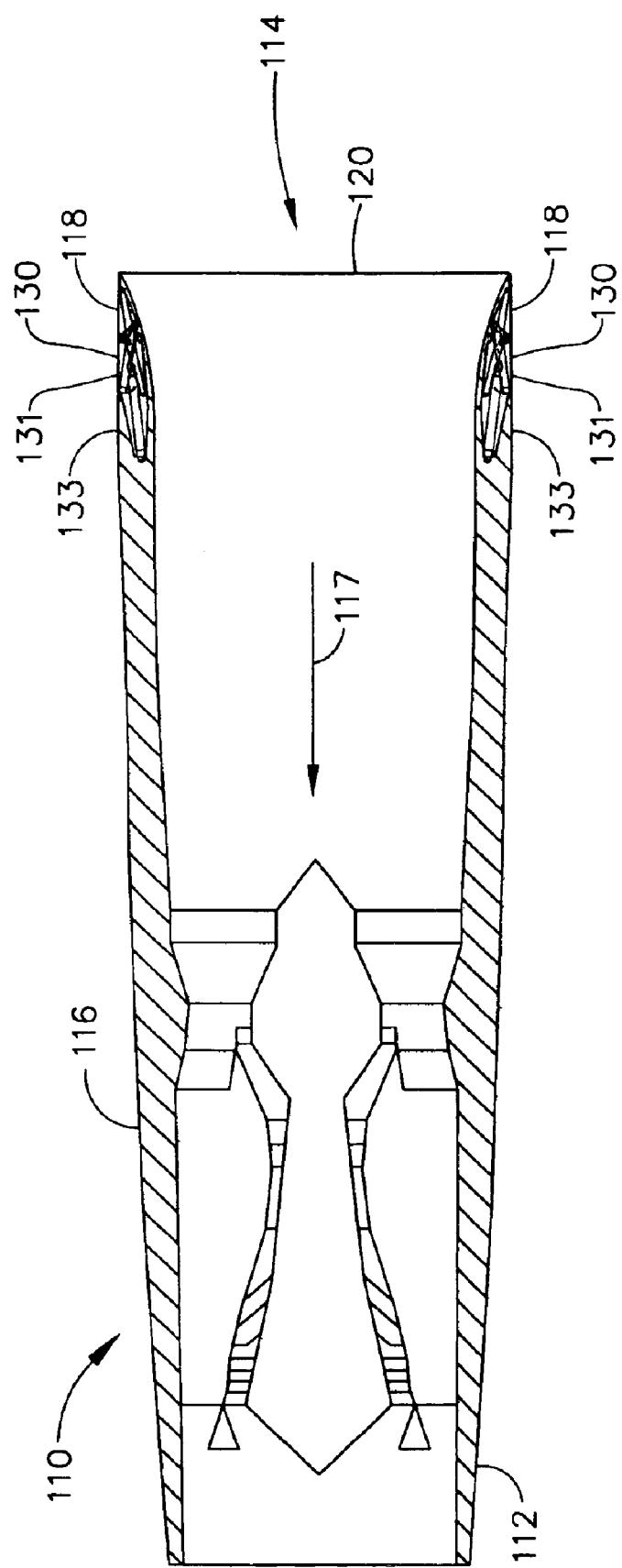
FIG. 8 is a plan view of the engine shown of FIG. 5 but with the apparatus for varying inlet lip geometry in a retracted position.

As shown in FIGS. 1 through 3, the inlet 14 comprises a scarfed side inlet having a generally rectangular inlet lip 20 that transitions to a generally circular duct. Alternatively, other embodiments of the invention include engines having scarfed inlets, unscarfed inlets, forward facing inlets, upwardly facing inlet, downwardly facing inlets, etc. For example, FIGS. 6 through 8 show an engine 110 that includes a forward facing inlet 114 having a generally rectangular inlet lip 120 that transitions to a generally circular duct.

With further reference to FIGS. 1 through 3, the inlet lip 20 includes a first and a second portion 22 and 24. The second inlet lip portion 24 is disposed aft or downstream of the first inlet lip portion 22.

As shown in FIG. 4, the skin portion 18 is hingedly coupled via a hinge 60 to the second inlet lip portion 24. Alternatively, other embodiments include the skin portion being supported around the entire inlet lip, such as in the generally rectangular inlet lip 120 of the forward facing inlet 114 shown in FIGS. 6 through 8.

In FIGS. 1, 2 and 4, the skin portion 18 is in a first configuration 26 that is preferred for landing and takeoff. In the first configuration 26, the skin portion 18 is convexly curved relative to the airflow direction 17. The skin portion 18 forms a rounded inlet lip portion 28 extending forwardly from the second inlet lip portion 24.

The rounded inlet lip portion 28 reduces turbulence at the second inlet lip portion 24, for example, when the aircraft is landing and taking off. The rounded inlet lip portion 28 also increases the area of the inlet 14 to allow ingestion of more air. By providing the inlet 14 with a more rounded shape, the air flow is also guided into the inlet 14 in a more clean manner. This, in turn, improves engine performance by eliminating, or at least reducing, cross wind flow into the inlet 14 at low speeds of the aircraft which might otherwise stall the engine 10.

Figure 5:
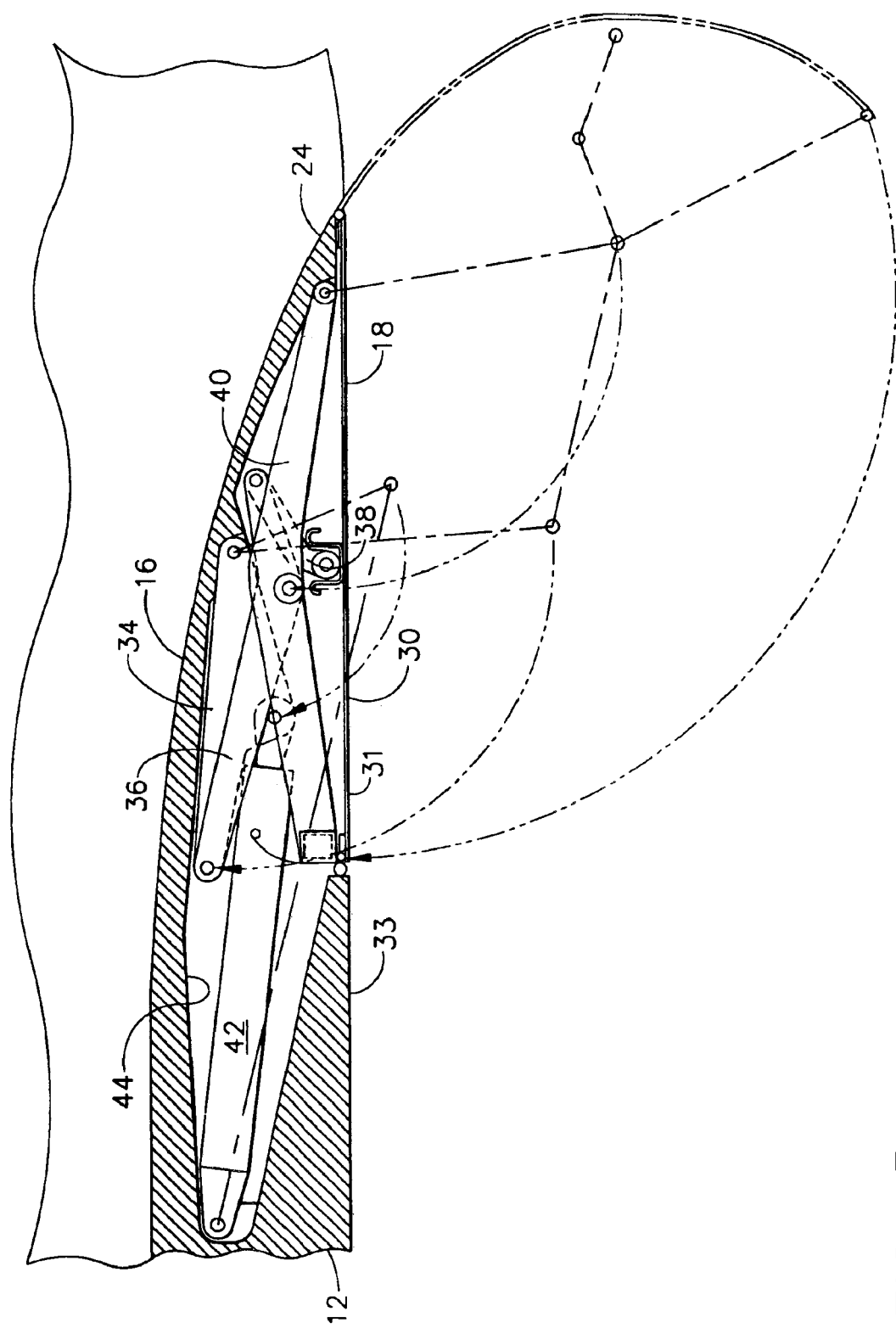
FIG. 5 is a plan view of the apparatus for varying inlet lip geometry shown in FIG. 3.

In FIGS. 3 and 5, the skin portion 18 is in a second configuration 30 that is preferred for cruise (i.e., when the aircraft is in a cruise mode of operation). In the second configuration 30, the skin portion 18 and the linkage assembly 32 are retracted within a recessed area of the nacelle 12 such that the skin portion 18 forms an aerodynamically smooth, continuous outer surface portion 31 of the nacelle 12 that is contiguous with the outer wall 33 of the nacelle 12.

If the aircraft is cruising at a sufficiently high speed, the airflow into the engine inlet can generate shock waves at the inlet. When the skin portion 18 is in the second configuration 30, the inlet 14 includes a generally sharp and thin inlet lip 20 that induces separation of the airflow at the inlet lip 20. This, in turn, increases turbulence and reduces the speed of the airflow into the inlet 14, which prevents, or least mitigates, the generation of shock waves at the inlet 14.

By using the first configuration 26 for takeoff and landing and the second configuration 30 for cruise, the side inlet 14 is able to operate at an efficiency comparable with that of a conventional forward facing inlet.

A wide range of suitable mounting systems and methods may be used to attach the skin portion 18 to the second inlet lip portion 24. In one exemplary embodiment, the skin portion 18 is hingedly mounted to the second inlet lip portion 24 with a hinge 60.

To allow for the variation (e.g., flexing, bending, etc.) of the skin portion's camber, the skin portion can be formed from a wide range of relatively flexible materials. In one embodiment, the skin portion 18 is formed of a fiberglass laminate, although other materials can be used.

The linkage assembly 32 will now be described in further detail. In the particular illustrated embodiment of FIG. 4, the linkage assembly 32 includes a four-bar linkage, links 34, 36, 38 and 40, although other quantities of links can be used. The first link 34 is drivingly coupled at point 46 to an actuator 42, which is pivotally coupled at point 64 to the nacelle forward end portion 16. The first link 34 is also pivotally coupled at point 48 to the nacelle forward end portion 16 and at point 50 to the second link 36. The second link 36 is further pivotally coupled at point 52 to the third link 38 and at point 54 to the fourth link 40. The third link 38 is further pivotally coupled at point 41 to the skin portion 18. The fourth link 40 is further coupled to a member 43, which is hingedly coupled via a hinge at point 62 to the skin portion 18. The fourth link 40 is also coupled at point 56 to the nacelle forward end portion 16.

The linkage assembly 32 is movable (as shown by broken lines in FIG. 5) to at least an extended position (FIG. 4) and to a retracted position (FIG. 5). It should be noted, however, that the linkage assembly 32 may also be positionable in one or more intermediate positions between its extended and retracted positions.

As the linkage assembly 32 is extended, the various links 34, 36, 38, 40 operate to flex or bend the skin portion 18 at the two spaced apart points 41 and 43 to configure the skin portion 18 into the first configuration 26. When the linkage assembly 32 is retracted, the various links 34, 36, 38, 40 operate to reconfigure (e.g., unflex or straighten, etc.) the skin portion 18 into the second configuration 30.

In addition, the linkage assembly 32 is adapted to be retracted into a recessed area in the nacelle 12 between the skin portion 18 and an inner wall 44 of the nacelle 12. The recessed area in the nacelle 12 is of sufficient size to accommodate the linkage assembly 32.

The links 34 through 40 can be formed from a wide range of suitable materials. In one embodiment, the links 34 through 40 are formed from a material having a relatively high strength to weight ratio, such as aluminum.

A wide range of actuators suitable for extending and retracting the linkage assembly 32 can be used for the actuator 42. Exemplary actuators include linear actuators, mechanical actuators, hydraulic actuators, electric actuators, pneumatic actuators, among other actuation means.

In one embodiment, the actuator 42 is operatively associated with an onboard aircraft computer (e.g., flight management computer (FMC)). This allows the operation of the actuator 42, and thus the linkage assembly 32 and skin portion 18, to be controlled by the flight crew and/or an automatic flight control system on board the aircraft.

In FIGS. 6 through 8, there is shown an aircraft engine 110 according to another embodiment of the invention. As shown, the aircraft engine 110 includes a forward facing inlet 114 formed at a forward end portion 116 of a nacelle 112. The direction of the airflow is indicated by arrow 117.

A variable camber skin portion 118 is hingedly coupled to the forward end portion 116. A linkage assembly 132 is coupled to the forward end portion 116 and the skin portion 118. The linkage assembly 132 operates to rotate the skin portion 118 relative to the forward end portion 116 and to alter a curvature of the skin portion 118 to thereby configure the skin portion 118 into a corresponding one of a plurality of configurations (e.g., 126, 130, etc.).

In FIG. 6, the skin portion 118 is in a configuration 126 in which the skin portion 118 forms a rounded inlet lip portion 128 extending forwardly of the inlet lip 120. In FIG. 8, the skin portion 118 is shown in another configuration 130 in which the skin portion 118 and the linkage assembly 132 are retracted within a recessed area of the nacelle 112 to form an aerodynamically smooth, continuous outer surface portion 131 of the nacelle 112 that is contiguous with the outer wall 133 of the nacelle 112.

In other embodiments, the skin portion can be extended and retracted by actuation structure similar to, but on a smaller scale, as the actuation structure described in either U.S. Pat. No. 3,504,870 entitled "Aircraft Wing Variable Camber Leading Edge Flap" or U.S. Pat. No. 6,375,126 entitled "Variable Camber Leading Edge For An Airfoil." The entire disclosures of U.S. Pat. Nos. 3,504,870 and 6,375,126 are each incorporated herein by reference in their entirety as if fully set forth herein.

In another form, the present invention provides methods for operating a jet engine within a nacelle. In one embodiment, the method generally includes: hingedly coupling a variable camber skin portion to the forward end portion of the housing; coupling a linkage assembly to the forward end portion and the skin portion; and operating the linkage assembly to rotate the skin portion relative to the forward end portion and to alter a curvature of the skin portion to thereby configure the skin portion into a corresponding one of a plurality of configurations. The plurality of configurations include at least a first configuration in which the skin portion forms a rounded inlet lip portion extending forwardly of the inlet, and a second configuration in which the skin portion and the linkage assembly are retracted within a recessed area in the housing to form an outer surface of the housing.

In another form, the present invention provides methods to increase area of an inlet for jet engine. In one embodiment, the method generally includes actuating a flap assembly near a lip of the inlet to extend a control surface into a flow stream and to increase area of the inlet. Actuating the flap assembly to extend the control surface reduces turbulence of the flow stream into the inlet. Actuating the flap assembly also alters a curvature of the control surface. The method may also include actuating the flap assembly to retract the control surface.

It is anticipated that the invention will be applicable to any of a wide range of aircraft including commercial jets, military jets, private jets, transonic aircraft, supersonic aircraft, subsonic aircraft, among others regardless of the manner in which the aircraft is piloted (e.g., directly, remotely, via automation, or in a combination thereof, among others). Accordingly, the specific references to aircraft herein should not be construed as limiting the scope of the present invention to only one specific form/type of aircraft.

It is also anticipated that the invention will be applicable to any one of a wide range of nacelles and engines such as gas turbine engines, turbofan engines, turbojet engines, among others regardless of the manner in which the engines and/or the nacelles are mounted to the corresponding aircraft. Accordingly, the specific references to engine and nacelle herein should not be construed as limiting the scope of the present invention to only one specific form/type of engine, nacelle, and/or mounting arrangement.

The description of the invention is merely exemplary in nature and is in no way intended to limit the invention, its application, or uses. Thus, variations that do not depart from the substance of the invention are intended to be within the scope of the invention. Such variations are not to be regarded as a departure from the spirit and scope of the invention.

What is claimed is:

1. An inlet for a jet engine having variable geometry to alter airflow, the inlet comprising:
   lip structure defining the inlet, the lip structure comprising
      a wall that includes an inner surface and an outer surface, the outer surface comprising:
      a first portion; and
      a second portion that is pivotally coupled to the inner surface at a forward end with a hinge and is separable from the first portion at an aft end; and
   an actuator structure associated with the outer surface second portion and operable to vary the geometry of the inlet by pivoting the outer surface second portion about the hinge at the forward end such that the aft end separates from the outer surface first portion, moving outwardly and forward from the outer surface first portion, so that the outer surface second portion forms an extension of the inner surface projecting forward of the forward end.

2. The inlet of claim 1, wherein the geometry of the inlet is variable between at least:
   a first configuration in which the outer surface second portion projects forward of the outer surface second portion forward end to form a rounded inlet lip; and
   a second configuration in which the outer surface second portion is retracted such that the outer surface second portion aft end aligns with the outer surface first portion to form an aerodynamically smooth outer surface.

3. The inlet of claim 2, wherein the actuator structure is coupled to the outer surface second portion at two points to alter the curvature of the outer surface second portion forward end about the two points when in the first configuration.

4. The inlet of claim 1, wherein the actuator structure includes a linkage assembly.

5. The inlet of claim 4, wherein the linkage assembly includes a four-bar linkage.

6. The inlet of claim 1, wherein the inlet comprises a side inlet.

7. A jet engine for a mobile platform, the engine comprising:
   a housing including an inlet having a wall that includes an inner surface and an outer surface;
   a variable camber skin portion of the outer surface that is hingedly coupled to the inner surface at a forward end and separable from a static portion of the outer surface at an aft end;
   a linkage assembly retractable within a recess of the inlet wall and coupled to the the camber skin portion, the linkage assembly operating to rotate the camber skin portion at the forward end such that the aft end separates from outer surface static portion, moving outwardly and forward from the outer surface static portion, so that the camber skin portion forms an extension of the inner surface that project forward of the camber skin portion forward end to alter a curvature of the camber skin portion thereby configuring the camber skin portion to form a rounded inlet lip.

8. The engine of claim 7, wherein the linkage assembly is further operable to retract within the recess to move the camber skin portion from projecting forward of the camber skin portion forward end to a retracted position in which the camber skin portion aft end aligns with the outer surface static portion to form an aerodynamically smooth outer surface.

9. The engine of claim 8, wherein:
   the mobile platform comprises an aircraft;
   the camber skin portion is protected forward during takeoff and landing of the aircraft; and
   the camber skin is retracted while the aircraft is in a cruise mode of operation.

10. The engine of claim 7, wherein the linkage assembly is coupled to the camber skin portion at two points to alter the curvature of the skin portion about the two points.

11. The engine of claim 7, further comprising an actuator coupled to the linkage assembly for extending and retracting the linkage assembly.

12. The engine of claim 11, wherein the linkage assembly includes a four-bar linkage.

13. The engine of claim 7, wherein the housing comprises a nacelle.

14. The engine of claim 7, wherein the inlet comprises a side inlet.

15. The engine of claim 7, wherein:
the inlet includes a first inlet lip portion and a second inlet lip portion disposed aft of the first inlet lip portion; and
the camber skin portion is included in the second inlet lip portion.

16. An aircraft, comprising:
an engine nacelle including an inlet having a wall that includes an inner surface and an outer surface;
a variable camber skin portion of the outer surface that is hingedly coupled to the inner surface at a forward end and separable from a static portion of the outer surface at an aft end;
a linkage assembly retractable within a recess of the inlet wall and coupled to the camber skin portion, the linkage assembly operating to rotate the camber skin portion at the forward end such that the aft end separates from outer surface static portion, moving outwardly and forward from the outer surface static portion, so that the chamber skin portion forms an extension of the inner surface that projects forward of the camber skin portion forward end to alter a curvature of the camber skin portion thereby configuring the camber skin portion to form a rounded inlet lip.

17. The aircraft of claim 16, wherein the linkage assembly is further operable to retract within the recess to move the camber skin portion from projecting forward of the camber skin portion forward end to a retracted position in which the camber skin portion aft end aligns with the outer surface static portion to form an aerodynamically smooth outer surface.

18. The aircraft of claim 17, wherein:
the camber skin portion is protected forward during takeoff and landing of the aircraft; and
the camber skin is retracted while the aircraft is in a cruise mode of operation.

19. The aircraft of claim 16, wherein the linkage assembly is coupled to the camber skin portion at two points to alter the curvature of the skin portion about the two points.

20. The aircraft of claim 16, further comprising an actuator coupled to the linkage assembly for extending and retracting the linkage assembly.

21. The aircraft of claim 16, wherein the linkage assembly includes a four-bar linkage.

22. The aircraft of claim 16, wherein the inlet comprises a side inlet.

23. The aircraft of claim 16, wherein:
the inlet includes a first inlet lip portion and a second inlet lip portion disposed aft of the first inlet lip portion; and
the camber skin portion is included in the second inlet lip portion.

24. Apparatus for varying inlet lip geometry of an inlet formed at a forward end portion of a housing for a jet engine, the inlet having a wall that includes an inner surface and an outer surface, the apparatus comprising:
a variable camber skin portion of the outer surface that is hingedly coupled to the inner surface at a forward end and separable from a static portion of the outer surface at an aft end;
a linkage assembly retractable within a recess of the inlet wall and coupled to the camber skin portion, the linkage assembly operating to rotate the camber skin portion at the forward end such that the aft end separates from outer surface static portion, moving outwardly and forward from the outer surface static portion, so that the chamber skin portion forms an extension of the inner surface that project forward of the camber skin portion forward end to alter a curvature of the camber skin portion thereby configuring the camber skin portion to form a rounded inlet lip.

25. The apparatus of claim 24, wherein the linkage assembly is further operable to retract within the recess to move the camber skin portion from projecting forward of the camber skin portion forward end to a retracted position in which the camber skin portion aft end aligns with the outer surface static portion to form an aerodynamically smooth outer surface.

26. The apparatus of claim 24, wherein the linkage assembly is coupled to the camber skin portion at two points to alter the curvature of the skin portion about the two points.

27. The apparatus of claim 24, further comprising an actuator coupled to the linkage assembly for extending and retracting the linkage assembly.

28. The apparatus of claim 27, wherein the linkage assembly includes a four-bar linkage.

29. The apparatus of claim 24, wherein the housing comprises a nacelle.

30. The apparatus of claim 24, wherein the inlet comprises a side inlet.

31. The apparatus of claim 24, wherein:
the inlet includes a first inlet lip portion and a second inlet lip portion disposed aft of the first inlet lip portion; and
the camber skin portion is included in the second inlet lip portion.

32. A method to increase an area of an inlet of a jet engine housing including an inlet having a wall that includes an inner surface and an outer surface, the method comprising:
hingedly coupling a variable camber skin portion of the outer surface to the inner surface at a forward end, the camber skin portion separable from a static portion of the outer surface at an aft end;
coupling a linkage assembly to the camber skin portion; and
operating the linkage assembly to rotate the camber skin portion at the forward end such that the aft end separates from outer surface static portion, moving outwardly and forward from the outer surface static portion, so that the chamber skin portion forms an extension of the inner surface that project forward of the camber skin portion forward end to alter a curvature of the camber skin portion thereby configuring the camber skin portion to form a rounded inlet lip.

33. The method of claim 32, wherein the linkage assembly is further operable to retract within the recess to move the camber skin portion from projecting forward of the camber skin portion forward end to a retracted position in which the camber skin portion aft end aligns with the outer surface static portion to form an aerodynamically smooth outer surface.

34. The method of claim 33, wherein:
the jet engine is mounted on an aircraft;
the camber skin portion is protected forward during takeoff and landing of the aircraft; and
the camber skin is retracted while the aircraft is in cruise mode of operation.

35. The method of claim 32, wherein operating the linkage assembly comprises extending and retracting the linkage assembly.

36. The method of claim 35, wherein extending and retracting the linkage assembly comprises actuating an actuator coupled to the linkage assembly.

* * * * *